United States Patent [19]
Lewis et al.

[11] Patent Number: 6,138,099
[45] Date of Patent: Oct. 24, 2000

[54] AUTOMATICALLY UPDATING LANGUAGE MODELS

[75] Inventors: James R. Lewis, Delray Beach; Maria Smith, Plantation, both of Fla.

[73] Assignee: International Business Machines Corp., Armonk, N.Y.

[21] Appl. No.: 09/174,873

[22] Filed: Oct. 19, 1998

[51] Int. Cl.[7] ............................. G10L 15/18; G10L 15/26
[52] U.S. Cl. ....................... 704/257; 704/235; 704/260
[58] Field of Search ................................... 704/235, 257, 704/260

[56] References Cited

U.S. PATENT DOCUMENTS

| | | | |
|---|---|---|---|
| 5,799,273 | 8/1998 | Mitchell et al. | 704/235 |
| 5,864,805 | 1/1999 | Chen et al. | 704/235 |
| 5,970,451 | 10/1999 | Lewis et al. | 704/235 |
| 6,006,183 | 12/1999 | Lai et al. | 704/235 |
| 6,064,959 | 5/2000 | Young et al. | 704/251 |

OTHER PUBLICATIONS

Digital Dictate, Technical Manual and Installations Guid, Release 2.4, pp. 1–67, Mar. 1995.

*Primary Examiner*—Richemond Dorvil
*Assistant Examiner*—Abul K. Azad
*Attorney, Agent, or Firm*—Quarles & Brady LLP

[57] ABSTRACT

A method for updating a language model in a speech application during a correction session comprises the steps of: automatically acoustically comparing to one another audio of originally dictated text and audio for replacement text; and, automatically updating the language model with a correction if the acoustical comparison is close enough to indicate that the new audio represents correction of a misrecognition error rather than an edit, whereby the language model can be updated without user interaction. The updating step can comprise adding new words to a vocabulary in the speech application.

14 Claims, 2 Drawing Sheets

AUTOMATICALLY UPDATING LANGUAGE MODELS

BACKGROUND OF THE INVENTION

1. Field of the Invention

This invention relates generally to speech dictation systems, and in particular, to a method for automatically updating language models in speech recognition engines of speech applications during sessions in which speech misrecognitions are corrected.

2. Description of Related Art

Improvements to correction in speech dictation systems provide an important way to enhance user productivity. One style of improvement is to offer power users the ability to make changes directly to dictated text, bypassing interaction with correction dialogs. Unless the system monitors changes and decides which are corrections to be sent to the speech engine for processing as corrections, and which are edits to be ignored by the system, the user will not receive the benefit of continual improvement in recognition accuracy that occurs when the engine receives correction information.

SUMMARY OF THE INVENTION

The inventive arrangements have advantages over all present correction methods in speech dictation systems now used and provides a novel and nonobvious method for updating language models in speech recognition engines of speech applications during sessions in which speech misrecognitions are corrected, substantially without invoking a user interactive dialog box.

A method for updating a language model in a speech application during a correction session, in accordance with the inventive arrangements, comprises the steps of: automatically acoustically comparing to one another audio of originally dictated text and audio for replacement text; and, automatically updating the language model with a correction if the acoustical comparison is close enough to indicate that the new audio represents correction of a misrecognition error rather than an edit, whereby the language model can be updated without user interaction.

The method can further comprise the steps of, prior to the comparing step: detecting replacement of the originally dictated text with new text; and, saving the originally dictated audio and the new audio for use in the comparing step.

The updating step can comprise the step of adding new words to a vocabulary in the speech application.

The comparing step can comprise the steps of: determining whether any word of the new text is out of vocabulary; and, if no the word is out of vocabulary, utilizing existing baseforms in the vocabulary for the comparing step.

The comparing step can comprise the steps of: determining whether any word of the new text is out of vocabulary; if the any word is out of vocabulary, determining if a baseform for the any word is stored outside of the vocabulary; and, if the baseform for the any word is stored outside of the vocabulary, utilizing the out of vocabulary baseform for the comparing step.

The comparing step can also comprise the steps of: determining whether any word of the new text is out of vocabulary; if the any word is out of vocabulary, determining if a baseform for the any word is stored outside of the vocabulary; and, if no the baseform for the any word is stored outside of the vocabulary, deferring generation of a new baseform for the any word.

The comparing step can also comprise the steps of: determining whether any word of the new text is out of vocabulary; if the any word is out of vocabulary, determining if a baseform for the any word is stored outside of the vocabulary; if no the baseform for the any word is stored outside of the vocabulary, generating a new baseform for the any word; and, utilizing the new baseform for the comparing step.

The comparing step can also comprise the steps of: determining whether any word of the new text is out of vocabulary; if the any word is out of vocabulary, determining if a baseform for the any word is stored outside of the vocabulary; if the baseform for the any word is stored outside of the vocabulary, utilizing the out of vocabulary baseform for the comparing step; and, if no the baseform for the any word is stored outside of the vocabulary, deferring generation of a new baseform for the any word.

The comparing step can also further comprise the steps of: determining whether any word of the new text is out of vocabulary; if the any word is out of vocabulary, determining if a baseform for the any word is stored outside of the vocabulary; if the baseform for the any word is stored outside of the vocabulary, utilizing the out of vocabulary baseform for the comparing step; if no the baseform for the any word is stored outside of the vocabulary, generating a new baseform for the any word; and, utilizing the new baseform for the comparing step.

The comparing step can comprise the step of comparing respective baseforms of originally dictated words and replacements for the originally dictated words, for example with a DMCHECK utility.

BRIEF DESCRIPTION OF THE DRAWINGS

A presently preferred embodiment of the inventive arrangement and an alternative embodiment of the inventive arrangement are described in the drawings, it being understood, however, the inventive arrangements are not limited to the precise arrangements and instrumentalities shown.

DETAILED DESCRIPTION OF THE PREFERRED EMBODIMENTS

Figure 1:
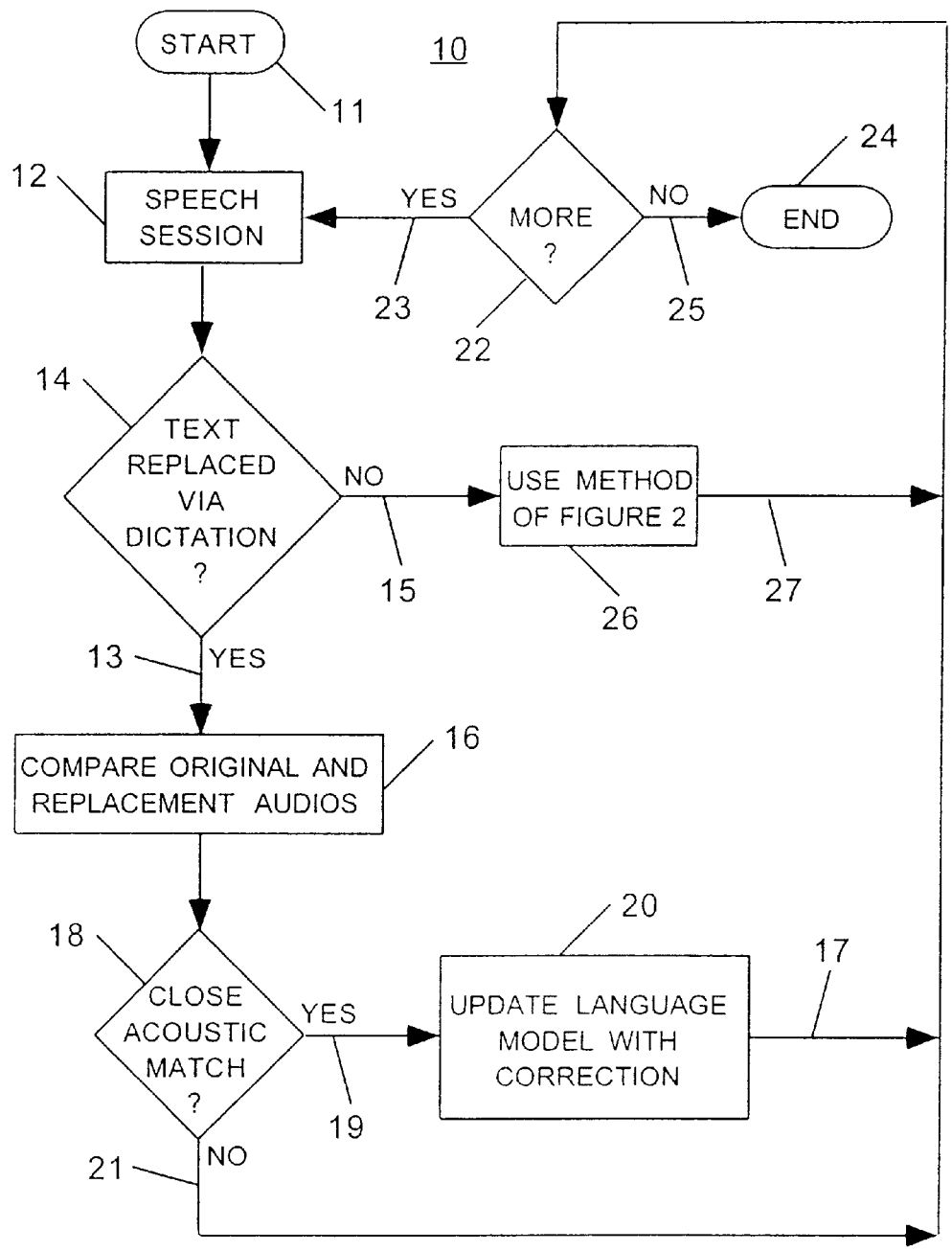
FIG. 1 is a flow chart illustrating the flow of program control in accordance with one aspect of the inventive arrangements when replacement text has audio.

A method for automatically updating language models in a speech application, in accordance with an inventive arrangement, is illustrated by flow chart 10 in FIG. 1. From start block 11, a speaker undertakes a speech recognition session with a speech application in accordance with the step of block 12.

In the step of block 14, the system initially detects whether originally dictated text has been replaced via dictation. If so, the method branches on path 13 to the step of block 16, which compares the original and replacement audios. In the step of block 18, the system determines whether a close acoustic match exists between the original audio and the replacement audio. If a close match exists, the method branches on path 19 to the step of block 20, in accordance with which the language model is updated with the correction. It should be appreciated that the language model consists of statistical information about word patterns. Accordingly, correcting the language model is not an acoustic correction, but a statistical correction. Subsequently, path 17 leads to the step of block 22 which detects whether more input is available for evaluation. If a close match does not exist, the method branches along path 21 which leads directly to the step of block 22, which detects whether additional input is available for evaluation.

If more input is available for evaluation, the method branches on path 23 back to the step of block 12. Otherwise, the method branches on path 25 to block 24, in accordance with which the method ends.

Figure 2:
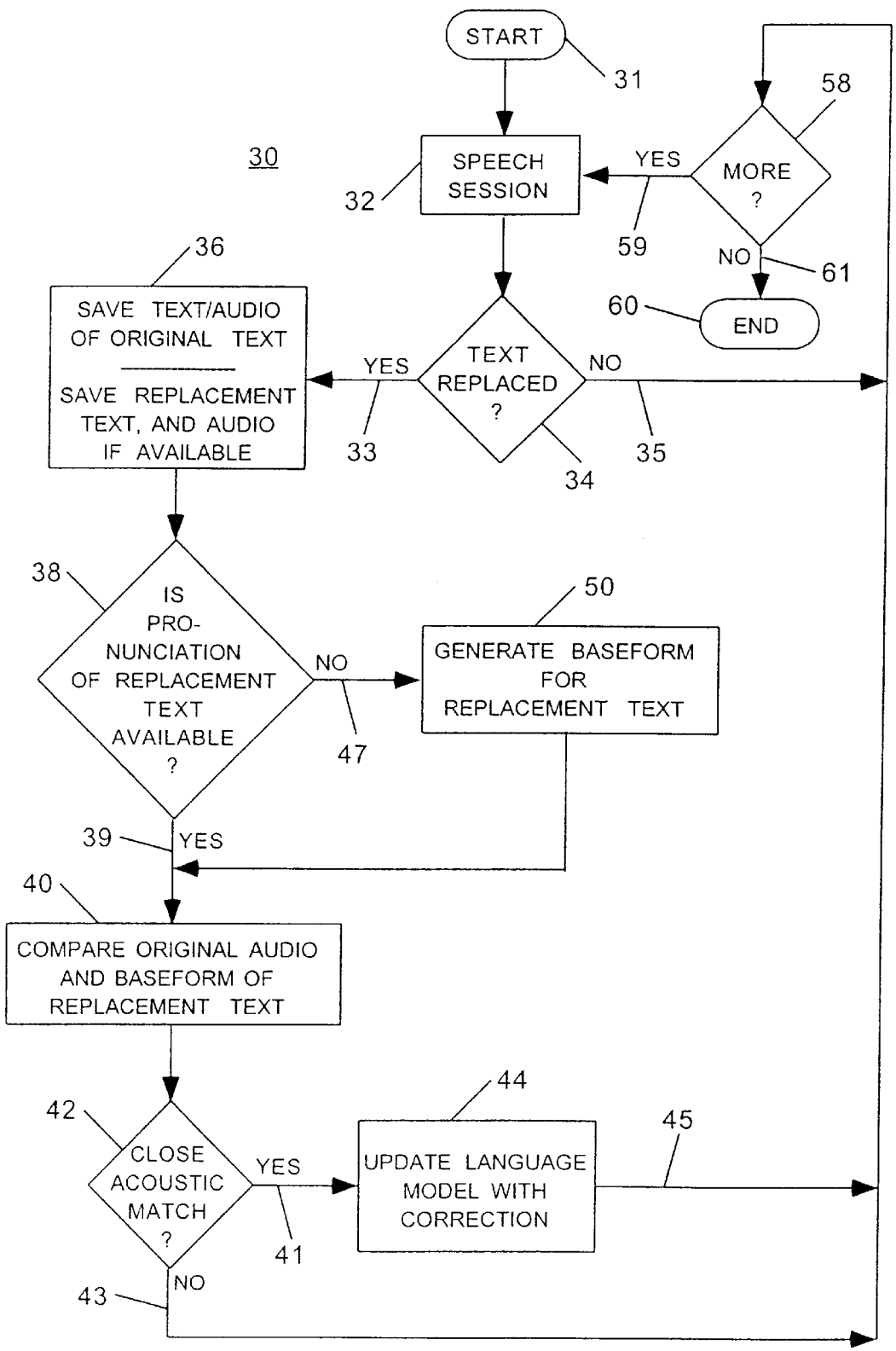
FIG. 2 is a flow chart illustrating the flow of program control in accordance with another aspect of the inventive arrangements when replacement text is obtained by dictation or typing.

If the originally dictated text has not been replaced via dictation, in accordance with the determination of decision block 14, the method branches on path 15 to the step of block 26, which indicates that the method described in connection with FIG. 2 is appropriate for use. Thereafter, path 27 leads to decision block 22, described above.

An alternative method for automatically updating language models in a speech application, in accordance with another inventive arrangement, is illustrated by flow chart 30 in FIG. 2. From start block 31, a speaker undertakes a speech recognition session with a speech application in accordance with the step of block 32. In the step of decision block 34, the system initially detects whether originally dictated text has been replaced with new text. If the originally dictated text has not been replaced with new text, the method branches on path 35 to the step of block 58 which detects whether more input is available for evaluation. If additional input is available for evaluation, the method branches on path 59 back to the step of block 32. Otherwise, the method branches on path 61 to the step of block 60, in accordance with which the method ends.

In the step of block 34, if the originally dictated text has been replaced with new text, the method branches on path 33 to the step of block 36 which saves the text and audio of the original text, saves the replacement text and, if available, saves the replacement audio. The ensuing step of decision block 38 tests whether a pronunciation of the replacement text is available. If so, the method branches on path 39 to the step of block 40, in accordance with which the original audio is compared to the baseform of the replacement text. If the replacement text baseform is not available, meaning the replacement text is out of vocabulary, the method branches on path 47 to the step of block 50, in accordance with which a baseform for the replacement text is generated. The baseform can be generated by using a text-to-speech engine or by user training of the speech recognition engine. Thereafter, the method leads to the step of block 40, explained above.

After the comparing step of block 40, a determination is made as to whether there is a close acoustic match between the original audio and the baseform of the replacement text, in accordance with the step of decision block 42. If a close match exists, the method branches on path 41 to the step of block 44, in accordance with which the language model is updated with the correction. The ensuing path 45 leads to the step of block 58, explained above. If a close match does not exist, the method branches along path 43 directly to the step of block 58, explained above.

What is claimed is:

1. A method for updating a language model in a speech application during a correction session, comprising the steps of:

automatically acoustically comparing to one another audio of originally dictated text and audio for replacement text; and, automatically updating said language model with a correction if said acoustical comparison is close enough to indicate that said new audio represents correction of a misrecognition error rather than an edit, whereby said language model can be updated without user interaction.

2. The method of claim 1, further comprising the steps of, prior to said comparing step:

detecting replacement of said originally dictated text with new text; and, saving said originally dictated audio and said new audio for use in said comparing step.

3. The method of claim 1, wherein said updating step comprises the step of adding new words to a vocabulary in said speech application.

4. The method of claim 1, wherein said comparing step comprises the steps of:

determining whether any word of said new text is out of vocabulary; and, if no said word is out of vocabulary, utilizing existing baseforms in said vocabulary for said comparing step.

5. The method of claim 1, wherein said comparing step comprises the steps of:

determining whether any word of said new text is out of vocabulary;

if said any word is out of vocabulary, determining if a baseform for said any word is stored outside of said vocabulary; and, if said baseform for said any word is stored outside of said vocabulary, utilizing said out of vocabulary baseform for said comparing step.

6. The method of claim 5, wherein said updating step comprises the step of adding said any word to said vocabulary.

7. The method of claim 1, wherein said comparing step comprises the steps of:

determining whether any word of said new text is out of vocabulary;

if said any word is out of vocabulary, determining if a baseform for said any word is stored outside of said vocabulary; and, if no said baseform for said any word is stored outside of said vocabulary, deferring generation of a new baseform for said any word.

8. The method of claim 1, wherein said comparing step comprises the steps of:

determining whether any word of said new text is out of vocabulary;

if said any word is out of vocabulary, determining if a baseform for said any word is stored outside of said vocabulary;

if no said baseform for said any word is stored outside of said vocabulary, generating a new baseform for said any word; and, utilizing said new baseform for said comparing step.

9. The method of claim 8, wherein said updating step comprises the step of adding said any word to said vocabulary.

10. The method of claim 1, wherein said comparing step comprises the steps of:

determining whether any word of said new text is out of vocabulary;

if said any word is out of vocabulary, determining if a baseform for said any word is stored outside of said vocabulary;

if said baseform for said any word is stored outside of said vocabulary, utilizing said out of vocabulary baseform for said comparing step; and, if no said baseform for said any word is stored outside of said vocabulary, deferring generation of a new baseform for said any word.

11. The method of claim 1, wherein said comparing step comprises the steps of:

determining whether any word of said new text is out of vocabulary;

if said any word is out of vocabulary, determining if a baseform for said any word is stored outside of said vocabulary;

if said baseform for said any word is stored outside of said vocabulary, utilizing said out of vocabulary baseform for said comparing step;

if no said baseform for said any word is stored outside of said vocabulary, generating a new baseform for said any word; and, utilizing said new baseform for said comparing step.

12. The method of claim 11, wherein said updating step comprises the step of adding said any word to said vocabulary.

13. The method of claim 1, wherein said comparing step comprises the step of comparing respective baseforms of originally dictated words and replacements for said originally dictated words.

14. The method of claim 13, comprising the step of comparing respective baseforms with a DMCHECK utility.

* * * * *